United States Patent
Mizuno et al.

(10) Patent No.: US 10,486,112 B2
(45) Date of Patent: *Nov. 26, 2019

(54) MICROPOROUS POLYOLEFIN FILM, SEPARATOR FOR BATTERY, AND PRODUCTION PROCESSES THEREFOR

(71) Applicant: TORAY INDUSTRIES, INC., Tokyo (JP)

(72) Inventors: Naoki Mizuno, Tochigi (JP); Masami Sugata, Tochigi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/512,047

(22) PCT Filed: Nov. 5, 2015

(86) PCT No.: PCT/JP2015/081183
§ 371 (c)(1),
(2) Date: Mar. 16, 2017

(87) PCT Pub. No.: WO2016/080200
PCT Pub. Date: May 26, 2016

(65) Prior Publication Data
US 2017/0274329 A1  Sep. 28, 2017

(30) Foreign Application Priority Data
Nov. 18, 2014 (JP) ................ 2014-233958

(51) Int. Cl.

| | | |
|---|---|---|
| *B01D 71/38* | (2006.01) | |
| *B32B 5/32* | (2006.01) | |
| *B32B 27/32* | (2006.01) | |
| *C08J 9/28* | (2006.01) | |
| *B01D 71/40* | (2006.01) | |
| *B21B 1/08* | (2006.01) | |
| *C08F 16/06* | (2006.01) | |
| *C08F 20/06* | (2006.01) | |
| *B01D 67/00* | (2006.01) | |
| *B01D 69/02* | (2006.01) | |
| *B01D 69/12* | (2006.01) | |
| *H01M 2/16* | (2006.01) | |
| *B01D 71/26* | (2006.01) | |
| *B01D 71/34* | (2006.01) | |

(52) U.S. Cl.
CPC ......... *B01D 71/38* (2013.01); *B01D 67/0025* (2013.01); *B01D 69/02* (2013.01); *B01D 69/12* (2013.01); *B01D 71/40* (2013.01); *B21B 1/0815* (2013.01); *B32B 5/32* (2013.01); *B32B 27/32* (2013.01); *C08F 16/06* (2013.01); *C08F 20/06* (2013.01); *C08J 9/28* (2013.01); *H01M 2/1653* (2013.01); *H01M 2/1686* (2013.01); *B01D 67/0013* (2013.01); *B01D 71/26* (2013.01); *B01D 71/34* (2013.01); *B01D 2325/04* (2013.01)

(58) Field of Classification Search
CPC ........ B01D 71/38; B01D 69/12; B01D 69/02; B01D 67/0025; B01D 71/40; C08F 20/06; C08F 16/06; H01M 2/1686; H01M 2/1653
See application file for complete search history.

(56) References Cited

U.S. PATENT DOCUMENTS

| | | | | |
|---|---|---|---|---|
| 2009/0250838 A1* | 10/2009 | Sano | .............. | B29C 55/005 264/291 |
| 2013/0116355 A1* | 5/2013 | Kang | .............. | C08L 23/06 521/143 |
| 2014/0361457 A1* | 12/2014 | Nogata | .............. | B01D 67/0027 264/210.4 |
| 2016/0276642 A1* | 9/2016 | Mizuno | .............. | H01M 2/145 |
| 2016/0336569 A1* | 11/2016 | Mizuno | .............. | H01M 2/145 |
| 2017/0317328 A1* | 11/2017 | Mizuno | .............. | B32B 5/32 |

FOREIGN PATENT DOCUMENTS

JP  2009-249480 A  * 10/2009
WO  WO-2014/175050 A1  * 10/2014

* cited by examiner

*Primary Examiner* — Peter D. Mulcahy
(74) *Attorney, Agent, or Firm* — Kilpatrick Townsend & Stockton LLP

(57) ABSTRACT

A polyolefin microporous membrane is disclosed. The membrane has a width of not less than 100 mm, and a variation range of an F25 value in a width direction is not greater than 1 MPa. The F25 value is a value obtained by dividing a load at 25% elongation of a sample of the laminated polyolefin microporous membrane as measured with a tensile testing machine by a cross-sectional area of the sample.

7 Claims, 3 Drawing Sheets

LONGITUDINAL
STRETCHING DEVICE A

LONGITUDINAL
STRETCHING DEVICE B

LONGITUDINAL
STRETCHING DEVICE C

RE-STRETCHING DEVICE

MICROPOROUS POLYOLEFIN FILM, SEPARATOR FOR BATTERY, AND PRODUCTION PROCESSES THEREFOR

CROSS-REFERENCE TO RELATED APPLICATIONS

This application is a United States National Phase Application of co-pending International Patent Application Number PCT/US2015/081183, filed Nov. 5, 2015 and entitled "MICROPOROUS POLYOLEFIN FILM, SEPARATOR FOR BATTERY, AND PRODUCTION PROCESSES THEREFOR", which Application claims priority to Japanese Patent Application Number 2014-233958 filed with the Japanese Patent Office on Nov. 18, 2014, the contents of which are incorporated herein by reference in their entirety.

TECHNICAL FIELD

The present invention relates to a polyolefin microporous membrane, a battery separator including a polyolefin microporous membrane having a porous layer on one or more sides thereof, and a method of production thereof.

BACKGROUND ART

Thermoplastic resin microporous membranes are used widely as a membrane for separation, selective permeation, isolation of substances, and the like. For example, the usage includes battery separators for lithium ion rechargeable batteries, nickel-metal hydride batteries, nickel-cadmium batteries, or polymer batteries, separators for electric double layer capacitors, various filters such as reverse osmosis filtration membrane, ultrafiltration membrane, microfiltration membrane and the like, waterproof moisture-vapor permeable clothes, and medical materials.

In particular, a polyethylene microporous membrane which exhibits ion permeability due to electrolytic solution impregnation, excellent electrical insulating properties, and a pore blocking effect, which blocks an electrical current to prevent an excessive temperature increase at a temperature of approximately 120 to 150° C. at the time of an abnormal temperature increase in a battery, is suitably used as a lithium ion rechargeable battery separator. However, if the temperature in a battery continues to increase even after the pore blocking for some reasons, the polyethylene microporous membrane may be punctured due to the shrinkage of the membrane. This phenomenon is not limited to polyethylene microporous membranes. Even in the case of a microporous membrane including another thermoplastic resin, this phenomenon cannot be avoided at a temperature equal to or higher the melting point of resin.

In particular, separators for lithium-ion batteries greatly affect battery characteristics, battery productivity and battery safety, and require good heat resistance, adhesion to electrode, permeability, membrane melt-puncture characteristics (melt-down characteristics) and the like. So far, the studies have been conducted that heat resistance and adhesion may be imparted to a battery separator by providing a porous layer with a polyolefin microporous membrane, for example. Polyamideimide resins, polyimide resins, and polyamide resins, which have good heat resistance, fluorine-based resins, which exhibit good adhesion, and the like are preferably used as resins constituting porous layers. Alternatively, a water-soluble or water-dispersible binder has been used in recent years, which can be used to form a multi-layer structure of porous layers using a relatively easy step.

Note that, in the present specification, porous layers are the layers obtained by a wet coating method.

In Example 5 in Patent Document 1, a multilayer porous membrane of a total thickness of 24 μm (coating thickness 4 μm) is obtained by coating an aqueous solution of uniformly dispersed titania particles and poly vinyl alcohol on a polyethylene microporous membrane of 20 μm thickness by a gravure coater, where the polyethylene microporous membrane is produced by the simultaneous biaxial stretching method, and drying the coated polyethylene microporous membrane at 60° C. to remove water.

In Example 3 in Patent Document 2, a multilayer porous membrane of a total thickness of 19 μm (coating thickness 3 μm) is obtained by coating an aqueous solution of uniformly dispersed titania particles and poly vinyl alcohol on a polyethylene microporous membrane of 16 μm thickness by a bar coater, where the polyethylene microporous membrane is produced by the simultaneous biaxial stretching method, and drying the coated polyethylene microporous membrane at 60° C. to remove water.

In Example 1 in Patent Document 3, the multilayer porous membrane is obtained by the same method described in Example 3 in Patent Document 2, except that a gravure coater is used.

In Example 6 in Patent Document 4, a polyethylene microporous membrane obtained by a sequential biaxial stretching method is passed through between Meyer bars, on which an appropriate amount of a coating solution containing meta-type wholly aromatic polyamide, an alumina particle, dimethylacetamide (DMAc) and tripropylene glycol (TPG) is provided, then subjected to coagulation, water washing, and drying steps, to obtain a non-water-based separator for a rechargeable battery, in which a heat-resistant porous layer is formed.

In Patent Document 5, a polyethylene microporous membrane obtained by a sequential biaxial stretching method is passed through between facing Meyer bars, on which an appropriate amount of a coating solution containing meta-type wholly aromatic polyamide, aluminum hydroxide, dimethylacetamide and tripropylene glycol is provided, then subjected to coagulation, water washing, and drying steps, to obtain a non-water-based separator for a rechargeable battery, in which a heat-resistant porous layer is formed.

In Patent Document 6, a polyethylene microporous membrane obtained by a sequential biaxial stretching method is passed through between facing Meyer bars, on which an appropriate amount of a coating solution containing polymetaphenylene isophthalamide and an aluminum particle, dimethylacetamide (DMAc) and tripropylene glycol (TPG) is provided, then subjected to coagulation, water washing, and drying steps, to obtain a non-water-based separator for a rechargeable battery, in which a heat-resistant porous layer is formed.

In Patent Document 7, a non-porous membrane-like material of three-layer structure, having a layer including polypropylene containing a β crystal nucleating agent as an outer layer, is longitudinally stretched using a longitudinal stretching device, then coated with an aqueous dispersion including an alumina particle and poly vinyl alcohol using a Meyer bar, stretched in a transverse direction at a magnification of 2, and subjected to heatsetting and relaxation treatment to obtain a multilayer porous film. The process is, namely, a combination of the sequential biaxial stretching method and in-line coating method.

In Patent Document 8, an example of a separation membrane is described. The separation membrane is obtained by a sequential biaxial stretching method, in which an angle of contact between the material to be stretched and a stretching roller is defined to be equal to or larger than a certain value, in a longitudinal stretching device configured with four stretching rollers.

CITATION LIST

Patent Literature

Patent Document 1: Japanese Unexamined Patent Application Publication No. 2007-273443A
Patent Document 2: Japanese Unexamined Patent Application Publication No. 2008-186721A
Patent Document 3: Japanese Unexamined Patent Application Publication No. 2009-026733A
Patent Document 4: Re-publication of PCT International Publication No. 2008-149895A1
Patent Document 5: Japanese Unexamined Patent Application Publication No. 2010-092882A
Patent Document 6: Japanese Unexamined Patent Application Publication No. 2009-205955A
Patent Document 7: Japanese Unexamined Patent Application Publication No. 2012-020437A
Patent Document 8: Japanese Translation of PCT International Application Publication No. 2013-530261A

SUMMARY OF INVENTION

Technical Problem

In recent years, the application of lithium ion rechargeable batteries has been studied for a wide variety of uses such as lawn mowers, weed whackers, small boats, and the like in addition to electric vehicles, hybrid electric vehicles and electric bikes. To this end, a larger battery in comparison with those used in a small digital device such as a conventional cell phone or a mobile information device is required. Accordingly, there is an increase in demand for a wider separator, having a width not less than 100 mm, that is configured in a battery.

To provide a multilayer in a polyolefin microporous membrane, it is more difficult to provide a porous layer having a uniform thickness in the width direction by coating, for a wider polyolefin microporous membrane. In particular, if a Meyer bar is used, deflection may appear in the Meyer bar itself as the coating width increases. Thus, uniform coating may be difficult.

If the thickness of a porous layer is not uniform (that is, there is some variation in thickness), e.g. the locally thin section may appear in the porous layer, the average thickness needs to be thicker, from 1.5 times to 2 times as thick as the minimum requirement for the thickness to ensure sufficient functionality of the porous layer. This may become a factor for cost increase. The thicker separator may decrease a number of turns in an electrode roll, which may hinder the increase in battery capacity.

Additionally, if the thickness variation of the porous layer is too large, a streak-like depression or a convex line may appear in the separator roll, or wavy wrinkles may occur at the edges of the roll. These defects negatively affect the winding appearance of the separator roll. This tendency may become pronounced as the number of the turns in the roll increases, and the number of the turns in the roll will increase as the thickness of a separator is reduced.

When the increase in battery size and in battery capacity is contemplated, it is difficult to provide a porous layer having a uniform thickness in the width direction on a wide polyolefin microporous membrane using a conventional coating technology, resulting in unsatisfactory quality of winding appearance of the roll and decrease in production yield.

The object of the present invention is to provide a polyolefin microporous membrane suitable for providing a porous layer having a uniform thickness, and having a width not less than 100 mm, wherein a variation range of an F25 value in a width direction is not greater than 1 MPa. Another object of the present invention is to provide a battery separator suitable for a higher battery capacity, in which a porous layer with a uniform thickness is provided on the polyolefin microporous membrane described above. Note that the expression "the thickness of a porous layer is uniform" in the present specification means that the variation range (R) of the porous layer thickness in the width direction is not greater than 1.0 μm.

Solution to Problem

The present inventors conducted diligent research not only on coating technologies, but also on polyolefin microporous membranes with regard to suitability to coating, and completed the present invention.

In order to solve the problems described above, the present invention includes a configuration below.

(1) A polyolefin microporous membrane having a width of not less than 100 mm, wherein a variation range of an F25 value in the width direction is not greater than 1 MPa, the F25 value being a value obtained by dividing a load measured at 25% elongation of a sample piece using a tensile testing machine by a cross-sectional area of the sample piece.

(2) A battery separator including a polyolefin microporous membrane and a porous layer on one or more sides of the polyolefin microporous membrane, wherein the porous layer includes a water-soluble resin or a water-dispersible resin and a heat-resistant particle,
 a variation range of an F25 value in a width direction of the polyolefin microporous membrane is not greater than 1 MPa, and
 an average thickness T(ave) of the porous layer is from 1 to 5 μm, the F25 value being a value obtained by dividing a load at 25% elongation of a sample piece using a tensile testing machine by a cross-sectional area of the sample piece.

(3) A battery separator including a porous layer on one or more sides of the polyolefin microporous membrane described in (1), wherein the porous layer includes a water-soluble resin or a water-dispersible resin and a heat-resistant particle, and an average thickness T(ave) of the porous layer is from 1 to 5 μm.

(4) The battery separator described above, wherein a thickness variation range (R) in a width direction of the porous layer is not greater than 1.0 μm.

(5) The battery separator described above, wherein the water-soluble resin or the water-dispersible resin includes one or more kinds selected from the group consisting of poly vinyl alcohol, acrylic resin, and polyvinylidene fluoride resin.

(6) The battery separator described above, wherein the width of the polyolefin microporous membrane is not less than 150 mm.

(7) The battery separator described above, wherein the width of the polyolefin microporous membrane is not less than 200 mm.

(8) A method of producing a polyolefin microporous membrane including:

(a) preparing a polyolefin resin solution by melt-kneading a polyolefin resin and a forming solvent;

(b) forming an unstretched gel sheet by extruding the polyolefin resin solution and cooling the extrudate;

(c) stretching the unstretched gel sheet in a longitudinal direction by passing the unstretched gel sheet between two or more pairs of longitudinal stretching rollers, wherein the two pairs of rollers have different peripheral speeds, to obtain a longitudinally stretched gel sheet, the pair of longitudinal stretching rollers including a longitudinal stretching roller and a nip roller contacting the longitudinal stretching roller in parallel, and a contact pressure of the nip roller against the longitudinal stretching roller being not lower than 0.05 MPa and not higher than 0.5 MPa;

(d) stretching the longitudinally stretched gel sheet in a transverse direction by holding the longitudinally stretched sheet at an inter-clip distance of not greater than 50 mm at a tenter exit to obtain a biaxially stretched gel sheet;

(e) extracting a forming solvent from the biaxially stretched gel sheet and drying the biaxially stretched gel sheet; and (f) heat-treating the sheet after drying to obtain the polyolefin microporous membrane.

(9) A method of producing a polyolefin microporous membrane roll including the method of producing a polyolefin microporous membrane described above, and further including winding the polyolefin microporous membrane on a winding core at a transporting speed of not less than 50 m/min.

(10) A method of producing a battery separator including coating a coating solution including a water-soluble resin or a water-dispersible resin and a heat-resistant particle on one or more sides of the polyolefin microporous membrane obtained by the method of production described above, by a roller-coat method wherein a width of a coating contact line between a coating roller and a polyolefin microporous membrane is not less than 3 mm and not greater than 10 mm.

(11) The method of producing a battery separator, wherein the coating roller is a gravure roller.

Advantageous Effects of Invention

According to an embodiment of the present invention, a polyolefin microporous membrane having a width of not less than 100 mm, for which the thickness of a porous layer can be uniform, is provided. According to another embodiment of the present invention, a battery separator suitable for a higher battery capacity, in which a porous layer with a uniform thickness is provided on the polyolefin microporous membrane described above, is provided.

DESCRIPTION OF EMBODIMENTS

Figure 1:
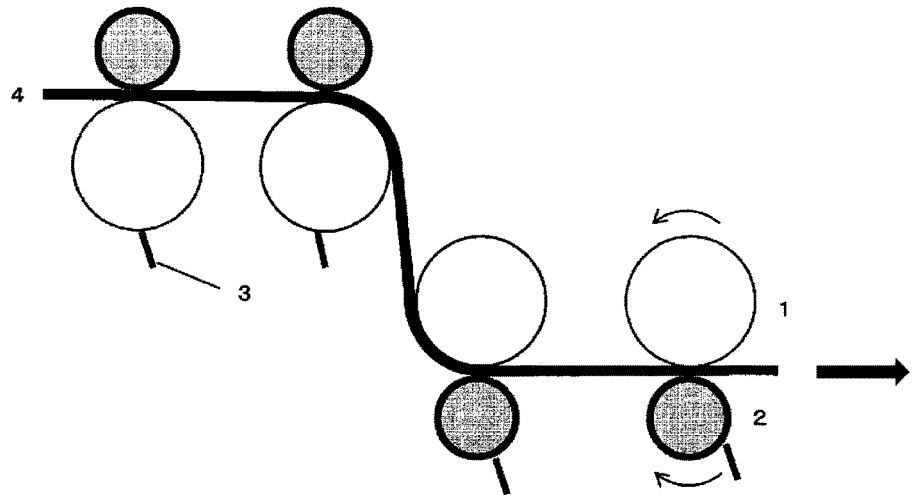
FIG. 1 is a schematic view illustrating a longitudinal stretching device A used in sequential biaxial stretching.

The polyolefin microporous membrane according to an embodiment of the present invention has a width not less than 100 mm and a variation range of an F25 value in the width direction of not greater than 1 MPa, wherein the F25 value is a value obtained by dividing a load measured at 25% elongation of a sample piece using a tensile testing machine by a cross-sectional area of the sample piece.

If the variation range of the F25 value in the width direction of the polyolefin microporous membrane according to an embodiment of the present invention is not greater than 1 MPa, a uniform contact pressure at a contact line of the polyolefin microporous membrane and the coating roller ("coating contact line" hereinafter) is easily achievable. Such a uniform contact pressure facilitates coating to a uniform thickness, resulting in an excellent benefit. If the variation range of the F25 value is greater than 1 MPa, the polyolefin microporous membrane may meander during transporting in slitting or coating steps, resulting in a poor winding appearance. Such an adverse effect may become significant in the case of fast speed processing, such as winding the membrane into a winding core at a transporting speed equal to or greater than 50 m/min.

1. Polyolefin Microporous Membrane

First, the polyolefin porous membrane according to an embodiment of the present invention will be described.

The polyolefin microporous membrane according to an embodiment of the present invention has a variation range of the F25 value of not greater than 1 MPa, preferably not greater than 0.8 MPa, more preferably not greater than 0.6 MPa, and most preferably not greater than 0.4 MPa. As described below, with precise control during longitudinal stretching and transverse stretching, the variation range of the F25 value of the polyolefin microporous membrane in the width direction can be controlled.

A polyethylene or polypropylene is preferable as the polyolefin resin that constitutes the polyolefin microporous membrane. The polyolefin resin can be a single component, a mixture of two or more kinds of different polyolefin resins, for example, a mixture of polyethylene and polypropylene, or copolymer of different olefins. Among these, polyethylene is particularly preferable from the viewpoint of good pore blocking characteristics. The melting point (softening temperature) of the polyethylene is preferably from 70 to 150° C., from the viewpoint of pore blocking characteristics.

Details are described below with polyethylene as a polyolefin resin used in the present invention.

Examples of polyethylene includes ultra-high molecular weight polyethylene, high density polyethylene, medium-density polyethylene, and low density polyethylene. Additionally, polymerization catalysts are not particularly limited, and include Ziegler-Natta catalyst, Phillips catalyst, and metallocene catalyst. These polyethylenes may be not only a homopolymer of ethylene, but also a copolymer that contains a small amount of other α-olefin. Examples of preferable α-olefin other than ethylene includes propylene, 1-butene, 1-pentene, 1-hexene, 4-methyl-1-pentene, 1-octene, (meth)acrylic acid, ester of (meth)acrylic acid, and styrene. Polyethylene may be a single component, but preferably be a polyethylene mixture of two or more kinds of polyethylene.

As a polyethylene mixture, a mixture of two or more kinds of high molecular weight polyethylene with different weight average molecular weight (Mw), a mixture of high density polyethylene, a mixture of medium-density polyethylene, or a mixture of low density polyethylene may be used. Also, a mixture of two or more kinds of polyethylene selected from the group consisting of high molecular weight polyethylene, high density polyethylene, medium-density polyethylene and low density polyethylene may be used. As a polyethylene mixture, a mixture of an ultra-high molecular weight polyethylene with a weight average molecular weight (Mw) of not less than $5 \times 10^5$ and a polyethylene with an Mw of not less than $1 \times 10^4$ and less than $5 \times 10^5$ is preferred. The content of the ultrahigh molecular weight polyethylene in the mixture is preferably from 1 to 40 wt. % from the viewpoint of tensile strength.

The molecular weight distribution (weight average molecular weight (Mw)/number average molecular weight (Mn)) of the polyethylene resin is preferably in the range from 5 to 200 from the viewpoint of mechanical strength.

2. Production Method for Polyolefin Microporous Membrane

A method of manufacturing the polyolefin porous membrane of the present invention is described.

There are two methods of producing a polyolefin microporous membrane: a dry method, in which a polyolefin microporous membrane is made porous by the use of a crystal nucleating agent or a particle without using a forming solvent (the method is also referred to as "drawing-pore-opening method"), and a wet method ("phase-separation method"). From the viewpoint of pore uniformity and flatness, the wet method is preferable.

Examples of the manufacturing method according to the wet method include a method including melting and kneading polyolefin with a forming solvent by heating, extruding the resultant resin solution through a die, cooling the extrudate to form an unstretched gel sheet, stretching the obtained unstretched gel sheet in one or more axes, and removing the forming solvent and dry the sheet, to obtain a microporous membrane.

The polyethylene microporous membrane may be a monolayer membrane or a membrane including two or more layers with different molecular weights or different average micropore sizes. For a layer configuration with two or more layers, it is preferable that the molecular weight and the molecular weight distribution of the polyethylene resin in one or more outer layers satisfy the conditions described above.

Methods of manufacturing a multi-layer polyolefin microporous membrane with two or more layers can be any one of the following methods. For example, in one method, each olefin that configures layer a and layer b is melt-kneaded with a forming solvent and the obtained respective resin solution is extruded from the respective extruders to a die, merging respective gel-sheets configuring each ingredient by co-extrusion. In another method, respective gel-sheets configuring each layers are overlapped and hot-melted. The co-extrusion method is preferred because an inter-layer adhesive strength is easily achieved; high permeability is easily maintained because communication holes are easily formed between layers; and productivity is superior.

The method of manufacturing a polyolefin porous membrane according to an embodiment of the present invention will be described in detail hereinafter.

In an embodiment of the present invention, stretching is performed on the unstretched gel sheet in two directions, machine direction (also referred to as "MD" or "longitudinal direction") and width direction (also referred to as "TD" or "transverse direction"), at a predetermined magnification, by a method selected from the group consisting of the roller method, the tenter method and the combination thereof. In the present invention, sequential biaxial stretching, in which stretching is performed in the longitudinal direction and in the transverse direction consecutively, is preferable. In simultaneous biaxial stretching, the unstretched gel sheet is immobilized by a clip holding both ends of the sheet and stretched by expanding the clip distance simultaneously in the longitudinal direction and in the transverse direction. In such a simultaneous biaxial stretching, the clip distance increases as the stretching magnification increases, resulting in a variation in sheet quality in the width direction. As a result, the variation range of the F25 value in the width direction increases, which is not preferable.

A method of manufacturing the polyolefin microporous membrane according to an embodiment of the present invention includes the steps of:

(a) preparing a polyolefin solution by melt-kneading a polyolefin resin and a forming solvent, (b) forming an unstretched gel sheet by extruding the polyolefin resin solution and cooling the extrudate, (c) forming a longitudinally stretched gel sheet by stretching the unstretched gel sheet in a longitudinal direction, (d) forming a biaxially stretched gel sheet by stretching the longitudinally stretched gel sheet in a transverse direction by holding the longitudinally stretched gel sheet so that the inter-clip distance at a tenter exit is not greater than 50 mm, (e) removing the forming solvent from the biaxially stretched gel sheet and drying, and (f) obtaining a polyolefin microporous membrane by heat-treating the dried sheet. Furthermore, the corona treatment step and the like can be optionally implemented after the steps from (a) to (f).

Each step is described below using the example in which polyethylene resin is used as polyolefin resin.

(a) Preparing a Polyethylene Resin Solution

In preparing a polyethylene resin solution, the polyolefin resin solution is prepared by adding a forming solvent to a polyethylene resin and then melt-kneading the solution. As a method of melt-kneading, methods using a twin-screw extruder described in Japanese Examined Patent Application Publication No. H06-104736A and Japanese Patent No. 3347835B can be used. Since melt-kneading methods are publicly known, explanation is omitted.

A forming solvent is not limited as long as the forming solvent can dissolve polyethylene sufficiently. For example, aliphatic or cyclic hydrocarbon such as nonane, decane, undecane, dodecane, liquid paraffin and the like, or mineral oil fractions and the like with their boiling points corresponding to these. A non-volatile solvent such as liquid paraffin is preferable.

The polyethylene resin concentration in the polyethylene resin solution is preferably from 25 to 40 parts by weight per 100 parts by weight of the total of the polyethylene resin and the forming solvent. If the polyethylene resin concentration is within the preferable ranges described above, swell and neck-in phenomena at the outlet of the die can be suppressed as the polyethylene resin solution is extruded, and formability and self-supporting characteristics of the gel sheet are maintained.

(b) Forming an Unstretched Gel Sheet

In forming an unstretched gel sheet, the polyethylene resin solution is supplied from the extruder to a die directly or via another extruder, extruded in a sheet-shape and the extrudate is cooled to form an unstretched gel sheet. Two or more polyolefin solution of an identical composition or different compositions may be supplied from the extruder to a die, laminated in layers therein and extruded in a sheet shape.

The extrusion method may be the flat die method or the inflation method. The temperature during extruding is preferably from 140 to 250° C. and the extruding speed is preferably from 0.2 to 15 m/min. The thicknesses can be controlled by adjusting the extruded amount of each of the polyolefin solutions. Methods disclosed in Japanese Examined Patent Application Publication H06-104736 and Japanese Patent No. 3347835B can be used as an extrusion method.

The gel sheet is formed by cooling the polyethylene resin solution extruded in a sheet shape. A method of bringing into contact with a cooling medium, such as cold air and cooling water, a method of bringing into contact with a cooling roller, and the like can be used as a cooling method, but it is preferable to cool the sheet by bringing the sheet into contact with a roller cooled with a cooling medium. For example, the polyethylene resin solution extruded from the die in a sheet shape is brought into contact with a rolling cooling roller to form an unstretched gel sheet. The surface of the cooling roller is controlled by the refrigerant to the temperature from 20° C. to 40° C. The extruded polyethylene resin solution is preferably cooled down to the temperature not higher than 25° C.

(c) Longitudinal Stretching

In longitudinal stretching, the unstretched gel sheet is passed through two or more pre-heat rollers so that a sheet temperature is increased to a predetermined temperature, passed through between two or more pairs of longitudinal stretching rollers and stretched in the longitudinal direction to form a longitudinally stretched gel sheet.

In an embodiment of the present invention, uniform longitudinal stretching while suppressing sheet slip during longitudinal stretching is important in terms of controlling the F25 value in the width direction.

In stretching, "a pair of rollers" refers to a longitudinal stretching roller and a nip roller contacting the longitudinal stretching roller in parallel at a constant pressure. Longitudinal stretching can be achieved by two pairs of rollers with different peripheral speeds while passing the unstretched gel sheet between two or more pairs of rollers. Parallel arrangement of the longitudinal stretching roller and the nip roller allows the sheet to closely contact on the longitudinal stretching roller, and the fixed position of the stretching of the sheet secures the stable transport of the sheet to achieve uniform longitudinal stretching. Increasing an area of contact between the longitudinal stretching roller and the gel sheet without using the nip roller fails to achieve sufficient suppression effect on slippage and may cause an increase in the variation range of the F25 value. Preferably, for a uniform longitudinal stretching, two or more steps of stretching instead of single stretching may be performed during the longitudinal stretching to realize the suitable stretching magnification. That is, three or more longitudinal stretching rollers are preferably arranged.

The temperature of the longitudinal stretching is not greater than (the melting point of the polyolefin resin+10° C.). The stretching magnification is preferably not less than 9 times and more preferably from 16 to 400 times in terms of planer magnification, from the viewpoint of the polyolefin microporous membrane elasticity and strength.

It is important to control the surface temperature of the longitudinal stretching roller uniformly within the effective width of the stretching roller (the width of which the sheet under stretching may pass) for each roller. The expression "controlling the surface temperature of the longitudinal stretching rollers uniformly" means that the surface temperature variation range is not greater than ±2° C., if the temperature is measured at five points along the width direction. The surface temperature of the longitudinal stretching roller can be measured by an infrared thermometer, for example.

The longitudinal stretching roller is preferably a metal roller plated with hard chromium, having a surface roughness of from 0.3 S to 5.0 S. The surface roughness within this range results in better thermal conductance and can suppress sheet slip effectively by working with a nip roller synergistically.

Suppression of sheet slip only by the use of one nip roller in the longitudinal stretching requires the increase in a contact pressure between the nip roller and the stretching roller (also referred to as "nip pressure"). Such a high contact pressure may present a risk of collapsing the micropores in the obtained polyethylene microporous membrane. Therefore, it is preferable to use two or more nip rollers, thereby relatively reducing the nip pressure of each nip roller to a respective longitudinal stretching roller. The nip pressure of each nip roller is not lower than 0.05 MPa and not higher than 0.5 MPa. If the nip pressure of a nip roller is higher than 0.5 MPa, it may present a risk of collapsing the micropores in the polyethylene microporous membrane. If the nip pressure is lower than 0.05 MPa, the pressure is not high enough to achieve sufficient suppression of slip. And effect of squeezing the forming solvent out from the sheet may not be realized properly. "Effect of squeezing the forming solvent" means stable stretching by squeezing out the forming solvent from the unstretched gel sheet or the gel sheet during longitudinal stretching to suppress slip against the longitudinal stretching roller. The lower limit of the nip pressure of the nip roller is preferably 0.1 MPa, and more preferably 0.2 MPa. The upper limit is preferably 0.5 MPa, and more preferably 0.4 MPa. If the nip pressure of the nip roller is within the range described above, the effect of slip suppression is appropriately realized.

Additionally, it is necessary to cover the nip roller with heat-resistant rubber. During the longitudinal stretching, the forming solvent may bleed out from the gel sheet due to heat or pressure caused by tension. Bleeding out is especially significant in the longitudinal stretching after extruding. The forming solvent bled out from the sheet may be present at an interface between the sheet and the roller while the sheet is transported or stretched. The sheet is more prone to slip as a result. The nip roller covered with the heat-resistant rubber can be arranged to contact with the longitudinal stretching roller in parallel. The unstretched gel sheet is passed through the rollers and can be stretched while the forming solvent is squeezed out from the gel sheet under stretching. Thus, the sheet-slip can be suppressed and the stabilized F25 value can be obtained.

If the method to remove the forming solvent deposited on the longitudinal stretching roller and the nip roller (also referred to as "removal method") is employed together with the methods described above, the effect of slip suppression can be further enhanced. The removal method is not particularly limited, and the method can be selected from the group consisting of the use of a doctor blade, blowing with the compressed air, suction and the combination thereof. Scraping off the forming solvent using the doctor blade is particularly preferable because of relative ease of implementation. The preferable method includes placing a doctor blade on the longitudinal stretching roller parallel to the transverse direction of the longitudinal stretching roller and scraping off the forming solvent to the extent that the forming solvent may not be observable on the stretching roller surface from the point immediately after the doctor blade to the point of contact with the gel sheet under stretching. One or more doctor blades can be employed. The removal method may be employed on the longitudinal stretching roller and/or on the nip roller.

The material of the doctor blade is not particularly limited as long as the material has resistance to a forming solvent. However, a resin or rubber doctor blade is preferred compared to a metal doctor blade. The metal doctor blade may damage the stretching roller. Examples of the resin doctor blades include polyester, polyacetal, and polyethylene doctor blades.

(d) Transverse Stretching Step

Transverse stretching is described. The transverse direction is a direction perpendicular to the longitudinal direction.

In transverse stretching, the longitudinally stretched gel sheet is stretched in the transverse direction and the biaxially stretched gel sheet is obtained. After both edges of the longitudinally stretched gel sheet is immobilized by the clip, the clip is expanded in the transverse direction in the tenter. The inter-clip distance in the direction of sheet transport is preferably maintained at 50 mm or less, more preferably 25 mm or less and even more preferably 10 mm or less. If the inter-clip distance is within the range described above, the variation range of the F25 value in the width direction can be suppressed.

During the transverse stretching and heat treatment, it is preferable to divide the interior of the tenter into 10 to 30 zones and control the temperature of each zone independently so that the effect of abrupt change in temperature can be suppressed. For the zones set at the highest temperature in the heat treatment, it is preferable that the temperature of each zone is incrementally raised in the direction of sheet transport using hot air, so that the abrupt temperature increase would not occur between the zones in the heat treatment. Furthermore, in the present invention, it is important to control the occurrence of the temperature spots in the width direction in the tenter. The method to suppress the occurrence of the temperature spots is preferably to control the variation range of the wind speed of the hot air in the width direction to not greater than 3 m/s, more preferably to not greater than 2 m/s and even more preferably to not greater than 1 m/s. If the variation range of the wind speed of the hot air is not greater than 3 m/s, the variation range of the F25 value of the polyethylene microporous membrane in the width direction can be suppressed.

Note that the wind speed in the present invention is defined as the wind speed at the surface of the gel sheet under transverse stretching, and said surface is facing the outlet of the hot air nozzle. Such a wind speed can be measured by a hot-wire anemometer, such as Anemomaster Model 6161, manufactured by Kanomax Japan Inc.

(e) Removing the Forming Solvent from the Biaxially Stretched Gel Sheet and Drying The forming solvent is removed (washed) from the biaxially stretched gel sheet by using the washing solvent. The washing solvents that can be used are volatile solvents, and include hydrocarbons such as pentane, hexane, and heptane, chlorinated hydrocarbons such as methylene chloride and carbon tetrachloride, fluorinated hydrocarbons such as trifluoroethane, and ethers such as diethylether and dioxane. These washing solvents are appropriately selected according to the forming solvent used for dissolving polyethylene, and can be used alone or in combination thereof. The washing method includes immersion and extraction in the washing solvent, showering the washing solvent, suctioning the washing solvent from the opposite side of the sheet and combinations thereof. The washing described above is repeated until the residual solvent in the sheet reaches less than 1 wt. %. After the washing, the sheet is dried off. The method of drying includes heat drying, air-dry and the like.

(f) Obtaining a Polyolefin Microporous Membrane by Heat-treating the Dried Sheet A polyethylene microporous membrane is obtained by heat-treating the dried sheet. Heat treatment is preferably performed in the temperature range from 90 to 150° C. from the viewpoints of thermal shrinkage and air permeation resistance. The residence time of the heat treatment is not particularly limited, but generally is not less than 1 second and not longer than 10 minutes, and preferably from 3 seconds to not longer than 2 minutes. The heat treatment can be performed by any of the methods among the tenter method, roller method, pressing method, or free method.

Furthermore, it is preferable to shrink the sheet in at least one of MD (machine direction) and TD (transverse direction), while the sheet is immobilized in both directions, MD and TD, in the heat treatment. The heat treatment can remove the residual deformation in the polyolefin microporous membrane. Thermal shrinkage in MD and TD in the heat treatment is preferably from 0.01 to 50%, and more preferably from 3 to 20%, from the viewpoints of thermal shrinkage and air permeation resistance. Re-heating and re-stretching may be appropriately performed for the purpose of mechanical strength enhancement. The re-stretching may be either a stretching roller method or a tenter method. Meanwhile, the functionalization steps such as corona treatment or hydrophilization can be implemented optionally after the steps (a) to (f).

As described above, with precise control during longitudinal stretching and transverse stretching, the variation range of the F25 value of the polyethylene microporous membrane in the width direction can be reduced. Thus, not only the variation range of the coating thickness can be reduced with ease during the lamination of a porous layer, but also a battery separator roll with excellent winding appearance can be obtained. Furthermore, if the variation range of the F25 value is 1 MPa or less, meandering of the sheet during the transportation in the slitting or coating can be suppressed, even at the high transporting speed of 50 m/min or greater during winding by a rewinder, for example.

The thickness of the polyolefin microporous membrane is preferably from 5 to 25 μm from the viewpoint of the larger battery capacity.

The air permeation resistance of the polyolefin microporous membrane is preferably from 50 sec/100 ccAir to 300 sec/100 ccAir. The porosity of the polyolefin microporous membrane is preferably from 30 to 70%.

The average pore size of the polyolefin microporous membrane is preferably from 0.01 to 1.0 μm from the viewpoint of pore blocking characteristics.

3. Porous Layer

The porous layer is described below.

A porous layer described in the present invention refers to a layer, which provides or improves at least one of the functions among heat resistance, adhesion to an electrode material, wettability toward electrolytic solution and the like. The porous layer is composed of an inorganic particle and resin. The resin plays a role in providing or improving the functions described above, in binding inorganic particles together, and in biding the polyolefin microporous membrane and the porous layer. Examples of resin include poly vinyl alcohol, cellulose-ether resin, and acrylic resin. Examples of cellulose-ether resin include carboxymethyl cellulose (CMC), hydroxyethyl cellulose (HEC), carboxyethyl cellulose, methyl cellulose, ethyl cellulose, cyanoethyl cellulose, oxyethyl cellulose, and polyvinylidene fluoride resin. Also, the resin can be used in solution form or in aqueous dispersion form, and may be available commercially. Examples of the commercially available resins include "POVACOAT" (trade name) manufactured by Nissin Kasei Co., Ltd., "JULYMER" (trade name) AT-510, ET-410, FC-60, and SEK-301 manufactured by Toa Gosei Co., Ltd., UW-223SX, and UW-550CS manufactured by Taisei Fine Chemical Co., Ltd., WE-301, EC-906EF, and CG-8490 manufactured by DIC Corporation, "KYRNAR" (trade name) WATERBORNE manufactured by Arkema K. K., and VINYCOAT PVDF AQ360 manufactured by Higashi Nippon Toryo Co., Ltd. If the priority is on heat resistance, poly vinyl alcohol or acrylic resin is suitably employed. If the priority is on adhesion to electrode and compatibility with non-aqueous electrolytic solution, polyvinylidene fluoride resin is suitably employed.

To reduce curl of a separator due to the lamination of the porous layer, it is important to include an inorganic particle to the porous layer. Examples of inorganic particles include calcium carbonate, calcium phosphate, amorphous silica, crystalline glass fillers, kaolin, talc, titanium dioxide, alumina, silica-alumina conjugate oxide particles, barium sulfate, calcium fluoride, lithium fluoride, zeolite, molybdenum sulfide, mica, and boehmite. A heat-resistant cross-linked polymeric particle may be added as necessary. Examples of the heat-resistant cross-linked polymeric particles include cross-linked polystyrene particles, cross-linked acrylic resin particles, cross-linked methyl-methacrylate based particles and the like. The shape of the inorganic particles includes spherical shape, substantially spherical shape, plate shape, needle shape, or polyhedron shape. But it is not particularly limited.

The average particle size of the inorganic particles is preferably not less than 1.5 times and not greater than 50 times and more preferably not less than 2 times and not greater than 20 times the average pore size of the polyolefin microporous membrane. When the average size of the particles is within the preferable range described above, the pores in the polyolefin microporous membrane may be blocked while the heat-resistant resin and the particles coexist, and air permeation resistance can be maintained as a result. Meanwhile, it can prevent shedding of particles during the battery assembly, which may cause serious failure of the battery.

The upper limit of the inorganic particles included is preferably 98 vol % and more preferably 95 vol %, per 100 vol % of the coating slurry described below. The lower limit of the inorganic particles included is preferably 50 vol % and more preferably 60 vol %. When the amount of the particle added is within the preferable range described above, the reduction of the curl is sufficient, and the ratio of the functionalized resin based on the total volume of the porous layer is the most suitable.

The average thickness T(ave) of the porous layer is preferably from 1 to 5 µm, more preferably from 1 to 4 µm, and even more preferably from 1 to 3 µm. If the membrane thickness of the porous layer is within the preferably range described above, the variation range (R) of the porous layer thickness can be suppressed. A battery separator obtained by laminating porous layers can maintain membrane puncture resistance and electrical insulation in the event of melting/ shrinking at the melting point or higher. In addition, the volume upon winding can be reduced, thus being suitable for battery capacity increase.

The porosity of the porous layer is preferably from 30 to 90%, and more preferably from 40 to 70%. The desired porosity can be achieved by appropriately adjusting the inorganic particle concentration, the binder concentration, and the like.

4. Laminating Porous Layer on Polyolefin Microporous Membrane

A method of laminating the porous layer on the polyolefin porous membrane of the present invention is described.

According to an embodiment of the present invention, a battery separator can be obtained by laminating the porous layers on the polyolefin microporous membrane that has a variation range of the F25 value in the width direction not greater than 1 MPa. If the polyolefin microporous membrane according to an embodiment of the present invention is used, a uniform contact pressure at a contact line of the polyolefin microporous membrane and the coating roller ("coating contact line" hereinafter) is easily achievable. Such a uniform contact pressure facilitates the coating thickness to be uniform.

Examples of the method of laminating the porous layer on the polyolefin microporous membrane include a method in which, using the conventionally known roller-coat method described below, a coating solution including a resin, an inorganic particle and a dispersion solvent is coated on the polyolefin microporous membrane to the predetermined thickness by the method described below, and dried at the drying temperature of from 40 to 80° C. for a drying time of from 5 to 60 seconds. Examples of the solvent include water, alcohols, and the mixtures thereof.

Examples of the roller-coat methods include reverse roller coating and gravure coating, and these methods can be employed alone or in combination. From the viewpoint of the uniform coating thickness, gravure coating is preferable.

In the present invention, to obtain the uniform thickness of the porous layer, it is important that the width of a coating contact line between the roller and the polyolefin microporous membrane in the roller-coat method is not less than 3 mm and not greater than 10 mm in an effective coating width. If the width of a coating contact line is within the range described above, the uniform thickness in the width direction can be obtained. If the width of a coating contact line is greater than 10 mm, the contact pressure between the polyolefin microporous membrane and the coating roller becomes large, increasing the possibility of a scratch on the coating surface. The effective coating width is a width of a total coating width excluding the edge portions of 3 mm on both sides. This is because these portions of 3 mm on both sides of the coating width may have irregularities such as local bumps or bleeding of coating solution due to surface tension.

Figure 5:
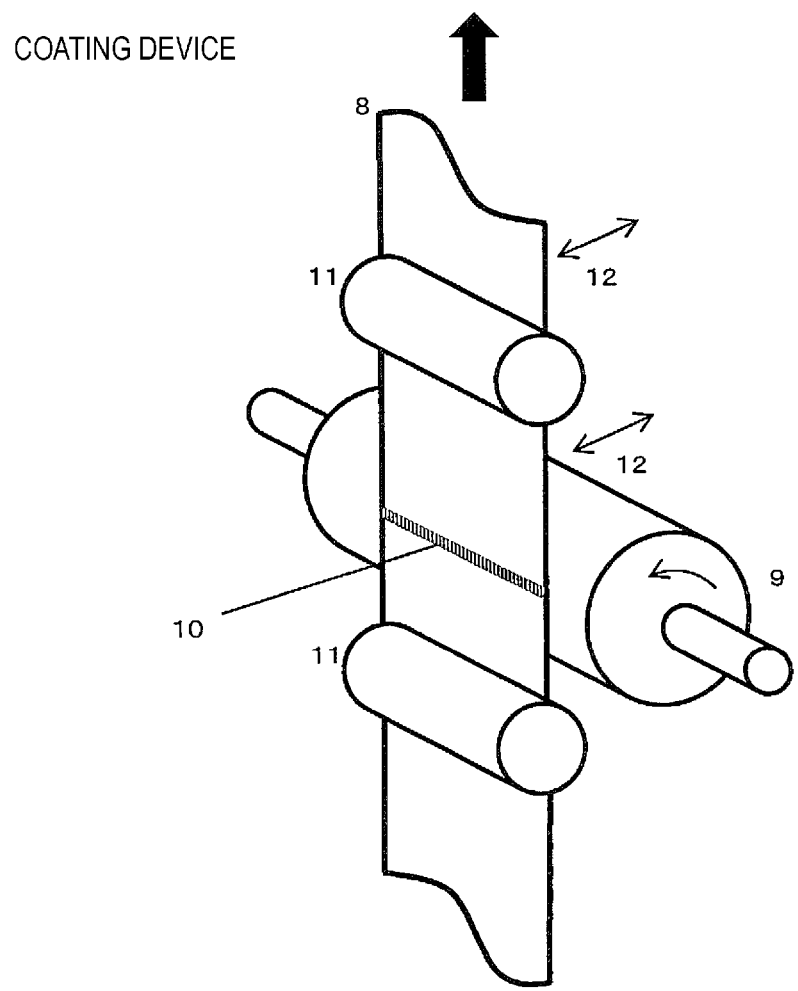
FIG. 5 is a schematic view illustrating an example of a coating device.

The coating contact line described herein is a line of the contact between the coating roller and the polyolefin microporous membrane and the width of a coating contact line refers to the width of a coating contact line in the machine direction (see FIG. 5). The width of a coating contact line can be measured by observing the coating contact line between the coating roller and the polyolefin microporous membrane from the opposite side of the polyolefin microporous membrane. The width of a coating contact line can be adjusted by adjusting the position of the coating roller relative to the polyolefin microporous membrane in machine direction or adjusting the left/right positional balance of the backing roller, which is disposed at the back of the coating surface, with regard to the horizontal direction. The backing rollers are more effectively positioned at both upstream and downstream of the coating roller.

Note that the expression "the thickness of a porous layer in the width direction of the separator is uniform" in the present specification means that the variation range (R) of the effective coating width in the width direction is not greater than 1.0 μm. The variation range of the thickness (R) is preferably not greater than 0.8 μm, and more preferably not greater than 0.5 μm.

Solid concentration of the coating solution is not particularly limited as long as the coating solution can be coated uniformly, but it is preferably not less than 20 wt. % and not greater than 80 wt. % and more preferably not less than 50 wt. % and not greater than 70 wt. %. If the solid concentration of the coating solution is within the range described above, the uniform thickness can be achieved easily and the porous layer is prevented from becoming brittle.

5. Battery Separator

The thickness of a battery separator, which is obtained by laminating the porous layer on the polyolefin microporous membrane, is preferably from 6 μm to 30 μm from the viewpoint of mechanical strength and battery capacity.

The length of the polyolefin microporous membrane and the battery separator is not particularly limited, but the lower limit thereof is preferably 0.5 m, more preferably 1 m, and even more preferably 10 m. The upper limit is preferably 10000 m, more preferably 8000 m and even more preferably 7000 m. If the length is less than 0.5 m, it is not only difficult to produce a battery but productivity is also diminished. If the length is greater than 10000 m, the weight becomes too large and the roll may experience deflection due to its own weight.

The lower limit of the width of the polyolefin microporous membrane and the battery separator is preferably 100 mm, more preferably 500 mm, and even more preferably 800 mm. The upper limit thereof is not particularly limited, but it is preferably 3000 mm, more preferably 2000 mm, and even more preferably 1500 mm. If the width is less than 100 mm, it will not be suitable for a larger battery in the future. If the width is greater than 3000 mm, uniform coating becomes difficult and the roll may experience deflection due to its own weight.

It is desirable to store the battery separator in a dry state. However, if storage in an absolute dry state is difficult, the battery separator is preferably subjected to a vacuum drying treatment at the temperature not higher than 100° C. just before use.

The air permeation resistance of the battery separator is preferably from 50 to 600 sec/100 ccAir.

The battery separator according to an embodiment of the present invention can be used for separators in rechargeable batteries such as nickel-metal hydride batteries, nickel-cadmium batteries, nickel-zinc batteries, silver-zinc batteries, lithium rechargeable batteries, lithium polymer rechargeable batteries and the like, plastic film capacitors, ceramic capacitors, electric double layer capacitors and the like, but is preferably used as a separator for lithium ion rechargeable batteries. The use of the separator of an embodiment of the present invention in a lithium ion rechargeable battery is described below as an example. In lithium ion rechargeable batteries, a cathode and an anode are laminated with a separator interposed therebetween, and the separator contains an electrolytic solution (an electrolyte). The structure of the electrode is not particularly limited, and can be a known structure. For example, an electrode structure in which disc-shaped cathode and anode are placed to face each other (coin type), an electrode structure in which planar cathode and anode are alternately laminated (lamination type), an electrode structure in which band-shaped cathode and anode are overlapped and wound (winding type) and the like can be employed.

EXAMPLES

The present invention is described below using examples. However, the present invention is not limited by these examples in any way. The measurement values in the examples are the values measured by the methods described below.

1. Measurement of Variation Range of F25 Value

Five sample pieces, sampled along the width direction of the polyolefin microporous membrane, of the size TD 10 mm×MD 50 mm were cut out from the polyolefin microporous membrane obtained in Examples and Comparative Examples. Note that the sample pieces near the both edges were cut out at the positions of not greater than 30 mm from the edges of the microporous membrane in the width direction. In accordance with JIS K7113, an S-S curve, the relationship between the normal force (stress) and the stain in the normal direction (strain), in the machine direction thereof was determined using the table-top precision universal tester (Autograph AGS-J, manufactured by Shimadzu Corporation). The normal strain at the normal strain of 25% elongation was recorded and the value was divided by the cross-sectional area of each sample piece. Measurements were made for triplicate sample pieces for each measurement position, and the average of these measurements was reported as the F25 value at each measurement position. The variation range of the F25 value was determined as the difference between the maximum and minimum of the F25 values. The polyolefin microporous membrane, obtained by delaminating and removing the porous layer from the battery separator, can be used as the sample piece.

Measurement Conditions

Load cell capacity: 1 kN

Inter-clip distance: 20 mm

Test speed: 20 mm/min

Measurement environment: temperature 20° C., relative humidity 60%

2. Variation Range of the Thickness of the Porous Layer in the Width Direction (R)

Five sample pieces, sampled along the width direction of the battery separator, of the size TD 10 mm×MD 50 mm were cut out from the battery separator obtained in Examples and Comparative Examples. Note that the sample pieces near the both edges were cut out at the positions of not greater than 30 mm from the edges of the separator in the width direction. The thickness of the porous layer was determined by SEM observation of the cross-section of each sample piece. The sample piece for cross-section observation was prepared by cryo cross section polishing (Cryo CP) and a minute amount of gold microparticles was deposited on the sample piece to prevent electrostatic charging from electron beam during SEM observation. The boundary between the polyolefin microporous membrane and the porous layer was determined by the presence of the inorganic particles. Triplicate sample pieces were measured for each measurement position, total of 15 points were obtained and the average of these 15 points was reported as the average thickness, T(ave), of the porous layer. The variation range (R) of the porous layer thickness in the width direction was determined from the difference between the maximum and the minimum of the average thickness of the porous layer at each measurement position.

Measurement Instrument

Field Emission Electron Scanning Microscope (FE-SEM) S-4800, manufactured by Hitachi High-Technologies Corporation.

Cross Section Polisher (CP) SM-9010, manufactured by JEOL Ltd.

Measurement Conditions

Acceleration voltage: 1.0 kV

3. Measurement of Width of a Coating Contact Line

Coating contact line is a line of contact in the width direction between the coating roller and the polyolefin microporous membrane during coating. The width of a coating contact line is the width of a coating contact line in the machine direction and measured using a scale observing from the opposite side of the polyolefin microporous membrane.

4. Winding Appearance

The rolls of the battery separator obtained in Examples and Comparative Examples were observed visually and the number of defects such as gauge band and edge-thickening or wavy-wrinkles was counted.

Evaluation Criteria

Good: None

Acceptable: from 1 to 3 defects

Fail: 4 or more defects

5. Transportability

The traveling deviation range of the polyolefin microporous membrane in the transverse direction was recorded during coating on the polyolefin microporous membrane at the transporting speed of 50 m/min for the length of 1000 m.

Evaluation Criteria

Good: less than 5 mm

Acceptable: from 5 to 10 mm

Fail: greater than 10 mm

6. Evaluation of Scratch

After removing the outermost wrap from the roll of the battery separator obtained in Examples and Comparative Examples, a sample of the size 1 m$^2$ was taken from the inner roll part for evaluation.

For detection of a scratch, Brome Light (lighting equipment used for photographic shooting or video recording) was used to light on a coating surface, then a scratch was visually observed. The number of the scratches was counted.

Evaluation Criteria

Good: 1 or less

Acceptable: from 2 to 5

Fail: not less than 6

Example 1

Production Method for Polyolefin Microporous Membrane

A polyethylene composition was prepared by dry-blending 0.375 parts by mass of tetrakis[methylene-3-(3,5-ditertiary-butyl-4-hydroxyphenyl)-propionate]methane into 100 parts by mass of a composition including 40 mass % of an ultra-high molecular weight polyethylene having a mass average molecular weight of $2.5 \times 10^6$ and 60 mass % of a high-density polyethylene having a mass average molecular weight of $2.8 \times 10^5$. 30 parts by weight of the polyethylene composition obtained was introduced into a biaxial extruder. In addition, through the side-feeder of the biaxial extruder, 70 parts by weight of liquid paraffin was supplied, and melt-kneaded to prepare a polyethylene resin solution inside the extruder. This was followed by extruding the polyethylene resin solution through the die disposed at the end of the extruder at 190° C. and forming an unstretched gel sheet while drawing the product out with a cooling roller with an internal cooling water temperature which was kept at 25° C. The unstretched gel sheet obtained was passed through a group of 4 pre-heat rollers so that the temperature of the sheet surface was 110° C., then introduced to a longitudinal stretching device A illustrated in FIG. 1. A metal roller plated with hard chromium (width: 1000 mm, diameter: 300 mm, surface roughness: 0.5 S) was used as a longitudinal stretching roller. Note that the temperature of each longitudinal stretching roller was 110° C. and the temperature variation range for each roller was not higher than ±2° C. A polyester doctor blade was used for a doctor blade. A nitrile rubber coated roller (manufacture by Katsura Roller Mfg. Co., Ltd.) was used as a nip roller. A pressure of each nip roller was 0.3 MPa. Each stretching roller in the longitudinal stretching device A had the peripheral speed ratio so that the rotation speed of each roller was faster as it was positioned downstream. Thus, the gel sheet was stretched at the magnification of 7 times in the longitudinal direction. Then, the sheet was passed through 4 cooling rollers so that the sheet temperature was cooled down to 50° C. and the longitudinally stretched gel sheet was formed.

Both edges of the longitudinally stretched gel sheet obtained were held by the clips, and was stretched in the transverse direction at the magnification of 6 times at the temperature of 115° C. in the tenter that was divided into 20 zones. The inter-clip distance in the direction of sheet transport was 5 mm from the entrance to the exit of the tenter. Also, the variation range of the wind speed of the hot air in the width direction in the tenter was adjusted to not greater than 3 m/sec. The biaxially stretched gel sheet obtained was cooled down to 30° C. and the liquid paraffin was removed from the sheet in the methylene chloride washing tank, temperature of which was controlled to 25° C. The sheet was dried in a dry oven controlled at 60° C.

Figure 4:
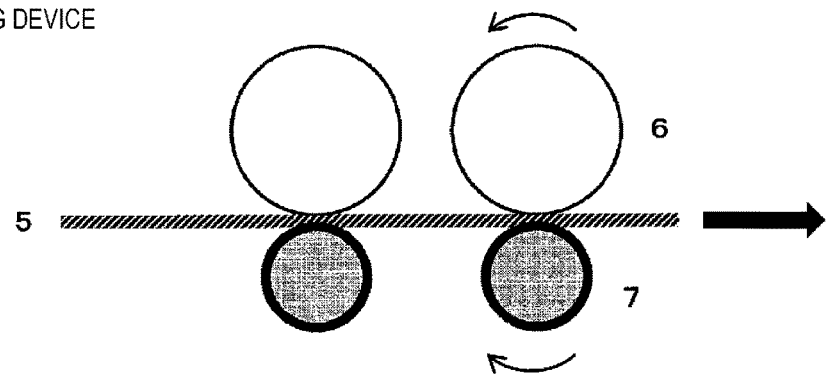
FIG. 4 is a schematic view illustrating an example of a longitudinal stretching device used in re-stretching.

The sheet obtained after drying was re-stretched at the longitudinal magnification of 1.2 times in the re-stretching device illustrated in FIG. 4, and heat-treated at 125° C. for 20 seconds to provide the polyolefin microporous membrane. The roll of the polyolefin microporous membrane (width: 2000 mm, longitudinal length: 5050 m) was obtained by winding the polyolefin microporous membrane at the transporting speed of 50 m/min during winding. The polyolefin microporous membrane was unwound from the obtained roll and slit processed to the width of 950 mm to produce the polyolefin microporous membrane A for a coating substrate.

Example 2

The polyolefin microporous membrane B for a coating substrate was obtained in the same manner as in Example 1, except that the width was 150 mm.

Example 3

The polyolefin microporous membrane C for a coating substrate was obtained in the same manner as in Example 1, except that the width was 1950 mm.

Example 4

The polyolefin microporous membrane D for a coating substrate was obtained in the same manner as in Example 1, except that the extruding amount of the polyethylene resin solution was adjusted so that the thickness was 7 μm.

Example 5

The polyolefin microporous membrane E for a coating substrate was obtained in the same manner as in Example 1, except that the pressure of each nip roller was 0.1 MPa.

Example 6

The polyolefin microporous membrane F for a coating substrate was obtained in the same manner as in Example 1, except that the pressure of each nip roller was 0.5 MPa.

Example 7

The polyolefin microporous membrane G for a coating substrate was obtained in the same manner as in Example 1, except that the 4 longitudinal stretching rollers were all ceramic-coated metal rollers with the surface roughness of 5S.

Example 8

Figure 2:
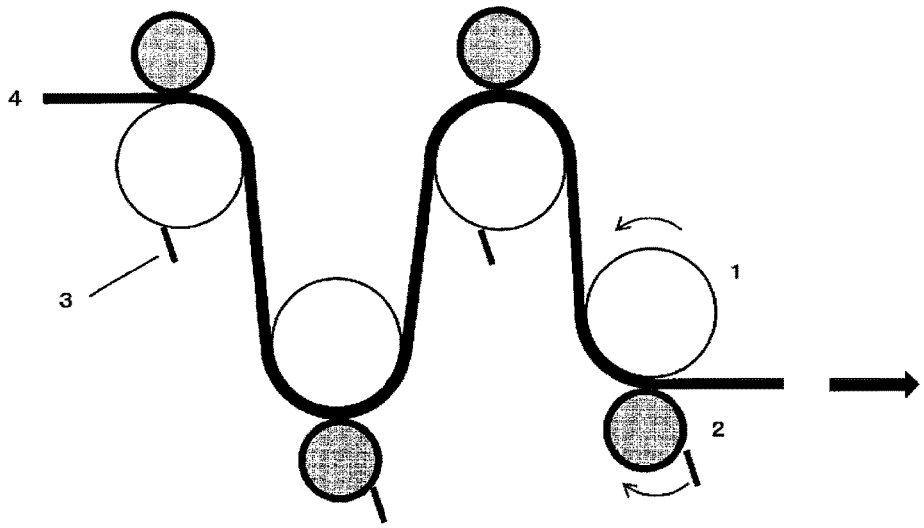
FIG. 2 is a schematic view illustrating a longitudinal stretching device B used in sequential biaxial stretching.

The polyolefin microporous membrane H for a coating substrate was obtained in the same manner as in Example 1, except that the longitudinal stretching device B illustrated in FIG. 2 was used instead of the longitudinal stretching device A as a longitudinal stretching device.

Example 9

Figure 3:
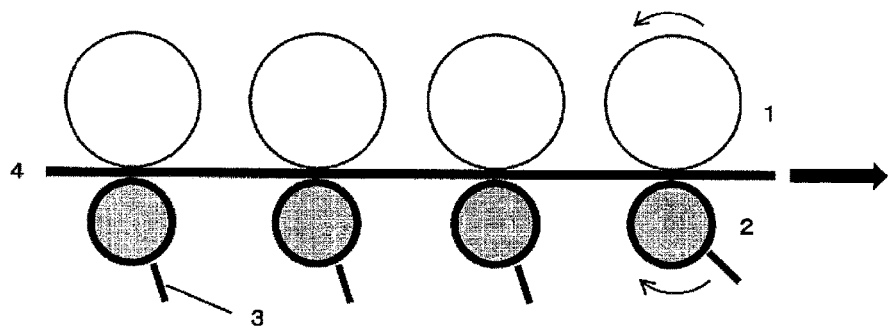
FIG. 3 is a schematic view illustrating a longitudinal stretching device C used in sequential biaxial stretching.

The polyolefin microporous membrane I for a coating substrate was obtained in the same manner as in Example 1, except that the longitudinal stretching device C illustrated in FIG. 3 was used instead of the longitudinal stretching device A as a longitudinal stretching device.

Comparative Example 1

Both ends of the unstretched gel sheet formed in Example 1 were held by the clips and the unstretched gel sheet was introduced to the tenter, which was divided into 5 zones controlled to the temperature of 116° C. The unstretched gel sheet was stretched 7 times in the longitudinal direction and 7 times in the transverse direction by the simultaneous biaxial stretching to form the biaxially stretched gel sheet. The inter-clip distance was 5 mm at the tenter entrance and 95 mm at the tenter exit in the direction of sheet transport. Also, variation range of the wind speed of the hot air in the width direction in the tenter was from 4 m/sec to 7 m/sec. The simultaneously biaxially stretched gel sheet was cooled down to 30° C. and the liquid paraffin was removed from the sheet in the methylene chloride washing tank, temperature of which was controlled to 25° C. The sheet, from which the liquid paraffin was removed, was dried in the dry oven controlled at 60° C. to produce the polyolefin microporous membrane. The roll of the polyolefin microporous membrane (width: 2000 mm, longitudinal length: 5050 m) was obtained by winding the polyolefin microporous membrane at the transporting speed of 50 m/min during winding. The polyolefin microporous membrane was unwound from the obtained roll and slit processed to the width of 950 mm to produce the polyolefin microporous membrane J for a coating substrate.

Comparative Example 2

The polyolefin microporous membrane K was obtained in the same manner as in Example 1, except that the 4 stretching rollers were used without a nip roller.

Comparative Example 3

The polyolefin microporous membrane L was obtained in the same manner as in Example 1, except that the pressure of each nip roller was 0.04 MPa.

Comparative Example 4

The polyolefin microporous membrane M was obtained in the same manner as in Example 1, except that the metal roller plated with hard chromium with the surface roughness 0.1 S was used for the longitudinal stretching roller.

Comparative Example 5

The polyolefin microporous membrane N was obtained in the same manner as in Example 1, except that the variation range of temperature for each longitudinal stretching roller was within ±3° C.

Comparative Example 6

The polyolefin microporous membrane O was obtained in the same manner as in Example 1, except that the longitudinal stretching device B was used instead of longitudinal stretching device A as the longitudinal stretching device, and the 4 stretching rollers were used without a nip roller.

Preparation of Coating Solution

Reference Example 1

Poly vinyl alcohol (average degree of polymerization: 1700, saponification degree: 99% or greater), alumina particles (average particle size: 0.5 μm) and deionized water were blended in the weight ratio of 6:54:40, respectively, stirred well and dispersed uniformly. Next, the coating solution (a) was obtained by filtering through a filter having a filtration limit of 5 μm.

Reference Example 2

Copolymer of poly vinyl alcohol, acrylate, and methyl methacrylate ("POVACOATR" (trade name) manufactured by Nissin Kasei, Co, Ltd.), alumina particles (average particle size: 0.5 μm) and solvent (deionzied water; ethanol=70: 30) were blended at the weight ratio of 5:45:50, respectively, stirred well and dispersed uniformly. Next, the coating solution (b) was obtained by filtering through a filter having a filtration limit of 5 μm.

Reference Example 3

Water-based emulsion of polyvinylidene fluoride resin (VINYLCOAT PVDF AQ360, manufactured by Higashi Nippon Toryo Co., Ltd.), alumina particles (average particle size: 0.5 μm), and deionized water were blended at the weight ratio of 30:30:40, respectively, and stirred well and dispersed uniformly. Next, the coating solution (c) was obtained by filtering through a filter having a filtration limit of 5 μm.

Preparation of Battery Separator

Example 10

The polyolefin microporous membrane A obtained in Example 1 was coated with the coating solution (a) using the coating device (gravure coating) illustrated in FIG. 5, at a transporting speed of 50 m/min, and passed and dried through the hot-air drier at 50° C. for 10 seconds to produce a battery separator. During the coating, the positions of the coating roller (gravure roller) and the backing roller of the coating device were adjusted so that the width of a coating contact line was within the range of from 3 to 5 mm. Next, the battery separator was slit processed to the effective coating width and the battery separator (the thickness of the battery separator: 18 μm, the thickness of the porous layer: 2 μm, the effective coating width: 900 mm, the longitudinal length: 5000 m) and the roll thereof were obtained.

Example 11

A battery separator was obtained in the same manner as in Example 10, except that the polyolefin microporous membrane B obtained in Example 2 was used. As a result, the battery separator (the effective coating width: 130 mm, the longitudinal length: 5000 m) and the roll thereof were obtained.

Example 12

A battery separator was obtained in the same manner as in Example 10, except that the polyolefin microporous membrane C obtained in Example 3 was used and the width of a coating contact line was within the range of from 4 to 9 mm by adjusting the positions of the gravure roller and the backing roller of the coating device. As a result, the battery separator (the effective coating width: 1900 mm, the longitudinal length: 5000 m) and the roll thereof were obtained.

Examples 13 to 18

Battery separators and the rolls thereof were obtained in the same manner as in Example 10, except that the polyolefin microporous membranes D to I obtained in Examples 4 to 9, respectively, were used.

Example 19

The battery separator and the roll thereof were obtained in the same manner as in Example 10 except that the coating solution (b) was used instead of the coating solution (a).

Example 20

The battery separator and the roll thereof were obtained in the same manner as in Example 10 except that the coating solution (c) was used instead of the coating solution (a).

Example 21

A battery separator and the roll thereof were obtained in the same manner as in Example 10, except that the width of a coating contact line was within the range of from 5 to 7 mm by adjusting the positions of the gravure roller and the backing roller of the coating device.

Example 22

A battery separator and the roll thereof were obtained in the same manner as in Example 10, except that the width of a coating contact line was within the range of from 8 to 10 mm by adjusting the positions of the gravure roller and the backing roller of the coating device.

Example 23

A battery separator and the roll thereof were obtained in the same manner as in Example 10, except that the cell capacity of the gravure roller in the coating device was changed so that the thickness of the porous layer was 5 μm and the thickness of the battery separator was 21 μm.

Comparative Examples 7 to 12

Battery separators and the rolls thereof were obtained in the same manner as in Example 10, except that the polyolefin microporous membranes J to O obtained in Comparative Examples 1 to 6, respectively, were used.

Comparative Example 13

A battery separator and the roll thereof were obtained in the same manner as in Example 10, except that the cell capacity of the gravure roller in the coating device was changed so that the thickness of the porous layer was 8 μm and the thickness of the battery separator was 24 μm.

Comparative Example 14

A battery separator and the roll thereof were obtained in the same manner as in Example 10, except that the width of a coating contact line was within the range of from 11 to 15 mm by adjusting the positions of the gravure roller and the backing roller of the coating device.

Comparative Example 15

A battery separator and the roll thereof were obtained in the same manner as in Example 10, except that the width of a coating contact line was within the range of from 20 to 25 mm by adjusting the positions of the gravure roller and the backing roller of the coating device.

Table 1 shows the production conditions and properties of the polyolefin microporous membranes obtained in the Examples 1 to 9 and Comparative Examples 1 to 6. Table 2 shows the coating conditions and the properties of the battery separators obtained in Examples 10 to 23 and Comparative Examples 7 to 15.

TABLE 1

| | Stretching method | Longitudinal stretching condition | | | | Transverse stretching condition | | Properties of polyethylene microporous membrane | | |
|---|---|---|---|---|---|---|---|---|---|---|
| | | Device | Surface roughness of the roller (S) | Nip roller pressure (MPa) | Variation range of the roller surface temperature | Inter-clip distance at the tenter exit (mm) | Variation range of the wind speed of the hot air in the width direction | Thickness (μ/m) | Width (mm) | Variation range of F25 value (MPa) |
| Example 1 | Sequential-biaxial stretching | A | 0.5 | 0.3 | Within ±2° C. | 5 | 3 m/s or less | 16 | 950 | 0.6 |
| Example 2 | Sequential-biaxial stretching | A | 0.5 | 0.3 | Within ±2° C. | 5 | 3 m/s or less | 16 | 150 | 0.1 |
| Example 3 | Sequential-biaxial stretching | A | 0.5 | 0.3 | Within ±2° C. | 5 | 3 m/s or less | 16 | 1950 | 1 |
| Example 4 | Sequential-biaxial stretching | A | 0.5 | 0.3 | Within ±2° C. | 5 | 3 m/s or less | 7 | 950 | 0.7 |
| Example 5 | Sequential-biaxial stretching | A | 0.5 | 0.1 | Within ±2° C. | 5 | 3 m/s or less | 16 | 950 | 0.4 |
| Example 6 | Sequential-biaxial stretching | A | 0.5 | 0.5 | Within ±2° C. | 5 | 3 m/s or less | 16 | 950 | 0.9 |
| Example 7 | Sequential-biaxial stretching | A | 5.0 | 0.3 | Within ±2° C. | 5 | 3 m/s or less | 16 | 950 | 0.4 |
| Example 8 | Sequential-biaxial stretching | B | 0.5 | 0.3 | Within ±2° C. | 5 | 3 m/s or less | 16 | 950 | 0.5 |
| Example 9 | Sequential-biaxial stretching | C | 0.5 | 0.3 | Within ±2° C. | 5 | 3 m/s or less | 16 | 950 | 0.7 |
| Comparative Example 1 | Simultaneous-biaxial stretching | — | — | — | — | 95 | from 4 to 7 m/s | 16 | 950 | 3.4 |
| Comparative Example 2 | Sequential-biaxial stretching | A | 0.5 | — | Within ±2° C. | 5 | 3 m/s or less | 16 | 950 | 1.9 |
| Comparative Example 3 | Sequential-biaxial stretching | A | 0.5 | 0.04 | Within ±2° C. | 5 | 3 m/s or less | 16 | 950 | 1.5 |
| Comparative Example 4 | Sequential-biaxial stretching | A | 0.1 | 0.3 | Within ±2° C. | 5 | 3 m/s or less | 16 | 950 | 1.2 |
| Comparative Example 5 | Sequential-biaxial stretching | A | 0.5 | 0.3 | Within ±3° C. | 5 | 3 m/s or less | 16 | 950 | 1.3 |
| Comparative Example 6 | Sequential-biaxial stretching | B | 0.5 | — | Within ±2° C. | 5 | 3 m/s or less | 16 | 950 | 1.7 |

TABLE 2

| | Polyethylene microporous membrane | Coating solution | Effective coating width (mm) | Width of coating contact line (mm) | Thickness of porous layer (μm) | Variation range of porous layer in the width direction (μm) | Winding appearance | Transportability | Scratches |
|---|---|---|---|---|---|---|---|---|---|
| Example 10 | A | a | 900 | from 3 to 5 | 2 | 0.5 | Good | Good | Good |
| Example 11 | B | a | 130 | from 3 to 5 | 2 | 0.2 | Good | Good | Good |
| Example 12 | C | a | 1900 | from 4 to 9 | 2 | 0.8 | Good | Good | Good |
| Example 13 | D | a | 900 | from 3 to 5 | 2 | 0.6 | Good | Good | Good |
| Example 14 | E | a | 900 | from 3 to 5 | 2 | 0.3 | Good | Good | Good |
| Example 15 | F | a | 900 | from 3 to 5 | 2 | 0.8 | Good | Good | Good |
| Example 16 | G | a | 900 | from 3 to 5 | 2 | 0.4 | Good | Good | Good |
| Example 17 | H | a | 900 | from 3 to 5 | 2 | 0.4 | Good | Good | Good |
| Example 18 | I | a | 900 | from 3 to 5 | 2 | 0.6 | Good | Good | Good |
| Example 19 | A | b | 900 | from 3 to 5 | 2 | 0.5 | Good | Good | Good |
| Example 20 | A | c | 900 | from 3 to 5 | 2 | 0.5 | Good | Good | Good |
| Example 21 | A | a | 900 | from 5 to 7 | 2 | 0.5 | Good | Good | Good |
| Example 22 | A | a | 900 | from 8 to 10 | 2 | 0.5 | Good | Good | Good |
| Example 23 | A | a | 900 | from 3 to 5 | 5 | 0.7 | Good | Good | Good |
| Comparative Example 7 | J | a | 900 | from 3 to 5 | 2 | 1.9 | Fail | Fail | Good |
| Comparative Example 8 | K | a | 900 | from 3 to 5 | 2 | 1.7 | Acceptable | Acceptable | Good |
| Comparative Example 9 | L | a | 900 | from 3 to 5 | 2 | 1.5 | Acceptable | Acceptable | Good |
| Comparative Example 10 | M | a | 900 | from 3 to 5 | 2 | 1.1 | Acceptable | Acceptable | Good |
| Comparative Example 11 | N | a | 900 | from 3 to 5 | 2 | 1.7 | Acceptable | Acceptable | Good |

TABLE 2-continued

|  | Polyethylene microporous membrane | Coating solution | Effective coating width (mm) | Width of coating contact line (mm) | Thickness of porous layer (μm) | Variation range of porous layer in the width direction (μm) | Winding appearance | Transportability | Scratches |
|---|---|---|---|---|---|---|---|---|---|
| Comparative Example 12 | O | a | 900 | from 3 to 5 | 2 | 1.6 | Acceptable | Acceptable | Good |
| Comparative Example 13 | A | a | 900 | from 3 to 5 | 8 | 1.3 | Good | Good | Good |
| Comparative Example 14 | A | a | 900 | from 11 to 15 | 2 | 1.2 | Good | Good | Acceptable |
| Comparative Example 15 | A | a | 900 | from 20 to 25 | 2 | 1.5 | Good | Good | Fail |

REFERENCE SIGNS LIST

1 Longitudinal stretching roller
2 Nip roller
3 Blade
4 Unstretched gel sheet
5 Biaxially stretched sheet
6 Longitudinal re-stretching roller
7 Nip roller for longitudinal re-stretching
8 Polyolefin microporous membrane
9 Coating roller
10 Coating contact line
11 Backing roller
12 Direction of roller position adjustment

The invention claimed is:

1. A polyolefin microporous membrane having a width of not less than 100 mm, wherein a variation range of an F25 value in a width direction is not greater than 1 MPa, and wherein the F25 value is obtained by dividing a load at 25% elongation of a sample of the polyolefin microporous membrane as measured with a tensile testing machine by a cross-sectional area of the sample.

2. A battery separator comprising:
a polyolefin microporous membrane; and
a porous layer on one or more sides of the polyolefin microporous membrane,
wherein:
the porous layer includes a water-soluble resin or a water-dispersible resin and a heat-resistant particle,
a variation range of an F25 value in a width direction of the polyolefin microporous membrane is not greater than 1 MPa,
an average thickness T(ave) of the porous layer is from 1 μm to 5 μm, and
the F25 value is obtained by dividing a load at 25% elongation of a sample of the polyolefin microporous membrane as measured with a tensile testing machine by a cross-sectional area of the sample.

3. The battery separator according to claim 2, wherein the polyolefin microporous membrane has a width of not less than 100 mm.

4. The battery separator according to claim 2, wherein a thickness variation range (R) in a width direction of the porous layer is not greater than 1.0 μm.

5. The battery separator according to claim 2, wherein the water-soluble resin or the water-dispersible resin includes one or more kinds selected from the group consisting of poly vinyl alcohol, acrylic resin, and polyvinylidene fluoride resin.

6. The battery separator according to claim 3, wherein a width of the polyolefin microporous membrane is not less than 500 mm.

7. The battery separator according to claim 3, wherein a width of the polyolefin microporous membrane is not less than 800 mm.

* * * * *